United States Patent
Harikumar et al.

(10) Patent No.: US 7,953,040 B2
(45) Date of Patent: May 31, 2011

(54) CHANNEL ASSIGNMENT IN WIRELESS COMMUNICATION

(75) Inventors: Gopal Harikumar, Westford, MA (US); Mehdi Alasti, Wilmington, MA (US)

(73) Assignee: Airvana Network Solutions, Inc., Chelmsford, MA (US)

( * ) Notice: Subject to any disclaimer, the term of this patent is extended or adjusted under 35 U.S.C. 154(b) by 455 days.

(21) Appl. No.: 11/406,600

(22) Filed: Apr. 19, 2006

(65) Prior Publication Data
US 2007/0248042 A1   Oct. 25, 2007

(51) Int. Cl.
*H04W 4/00* (2009.01)
(52) U.S. Cl. ............ 370/329; 455/450; 455/452.1; 455/452.2
(58) Field of Classification Search ............ 455/450, 455/452.1, 452.2; 370/329
See application file for complete search history.

(56) References Cited

U.S. PATENT DOCUMENTS

| | | | |
|---|---|---|---|
| 4,736,453 A * | 4/1988 | Schloemer | 455/450 |
| 5,828,963 A * | 10/1998 | Grandhi et al. | 455/450 |
| 6,023,622 A * | 2/2000 | Plaschke et al. | 455/452.2 |
| 6,122,514 A * | 9/2000 | Spaur et al. | 455/448 |
| 6,272,124 B1 * | 8/2001 | Ahn et al. | 370/342 |
| 6,512,752 B1 * | 1/2003 | H'mimy et al. | 370/329 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,975,604 B1 * | 12/2005 | Ishida et al. | 370/331 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,257,376 B2 * | 8/2007 | Reudink | 455/63.1 |
| 7,277,446 B1 | 10/2007 | Abi-Nassif et al. | |
| 7,299,278 B2 | 11/2007 | Ch'ng | |
| 7,453,860 B2 * | 11/2008 | Hogberg et al. | 370/341 |
| 2002/0173323 A1 * | 11/2002 | Tateson | 455/509 |
| 2002/0187799 A1 * | 12/2002 | Haartsen | 455/509 |
| 2002/0196749 A1 | 12/2002 | Eyuboglu et al. | |
| 2003/0100311 A1 | 5/2003 | Chung et al. | |
| 2004/0171401 A1 * | 9/2004 | Balachandran et al. | 455/522 |
| 2005/0207267 A1 * | 9/2005 | Birmingham et al. | 366/47 |
| 2005/0207441 A1 * | 9/2005 | Onggosanusi et al. | 370/464 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif et al. | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |
| 2006/0294241 A1 | 12/2006 | Cherian et al. | |

(Continued)

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Charles Shedrick
(74) *Attorney, Agent, or Firm* — Fish & Richardson P.C.

(57) ABSTRACT

In a radio access network, an access terminal is assigned frequency channels for communication between the access terminal and a radio node of a radio access network based on a strength of a signal determined for the access terminal.

22 Claims, 9 Drawing Sheets

U.S. PATENT DOCUMENTS

| | | |
|---|---|---|
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

* cited by examiner

CHANNEL ASSIGNMENT IN WIRELESS COMMUNICATION

TECHNICAL FIELD

This description relates to channel assignment in wireless communication.

BACKGROUND

Cellular wireless communications systems are designed to serve many access terminals distributed in a large geographic area by dividing the area into cells. At or near the center of each cell, a base transceiver station is located to serve access terminals (e.g., cellular telephones, laptops, PDAs) located in the cell. Each cell is often further divided into sectors by using multiple sectorized antennas. In each cell, a radio node at the base transceiver station serves one or more sectors and communicates with multiple access terminals in its cell. A radio node can generally support a certain amount of traffic in each sector for a particular bandwidth and it is often desirable to monitor the level of traffic in a sector in order to ensure that the sector is not becoming overloaded. Furthermore, it is often desirable to reduce delays in the flow of the traffic between the access terminals and the radio node, especially when the traffic includes delay-sensitive data, such as Voice over IP (VoIP) data.

SUMMARY

In general, in one aspect, the invention features a method and a computer program for assigning, to an access terminal, frequency channels for communication between the access terminal and a radio node of a radio access network based on a strength of a signal determined for the access terminal.

In another aspect, the invention features an apparatus including a radio network controller to assign, to an access terminal, channels facilitating communication between the access terminal and a radio node based on a signal strength (e.g., a signal-to-noise (SNR) ratio) determined for the access terminal.

Implementations may include one or more of the following. The signal strength for the access terminal may be monitored while communication (e.g., a transfer of voice over IP packets) is facilitated between the access terminal and the radio node over the channels; and the number of channels may be adjusted in response to detecting a change in the signal strength. Each of the channels may include a forward link for transmitting data from the radio node to the access terminal and a reverse link for transmitting data from the access terminal to the radio node. A number of channels assigned may be based on a comparison of the signal strength to a predetermined threshold. The signal strength may be determined based on a signal (e.g., a route update message signal) sent from the access terminal to the radio node. The signal strength may also be determined based from a data rate value sent from the access terminal to the radio node, the rate being proportional to a signal strength. Furthermore, the radio network controller may unassign and assign channels to the access terminal based on changes in the data rate value. The assigning may comply with one or more of: a 1×Evolution-Data Optimized (EV-DO) protocol, a 3×EV-DO protocol, an N×EV-DO protocol, and a IS856-Rev-B protocol.

Advantages that can be seen in particular implementations of the invention include one or more of the following. The number of channels providing communication between an access terminal and one or more radio nodes are assigned to the access terminal based upon the signal-to-noise ratio (SNR) of the access terminal. Access terminals with higher SNRs are assigned fewer channels while access terminals with lower SNRs are assigned more channels. The assignment of channels based on SNRs of the access terminals reduces the average delay of traffic over an access network and enables the network to simultaneously support a greater number of access terminals. Furthermore, by maintaining only those channels that are required to limit transmission delay to an acceptable level (e.g., as specified by a particular application, for instance VoIP), power and communication resources are conserved at the access terminals and at the radio nodes serving the access terminals.

Other features and advantages will be apparent from the description and from the claims.

DETAILED DESCRIPTION

Figure 1:
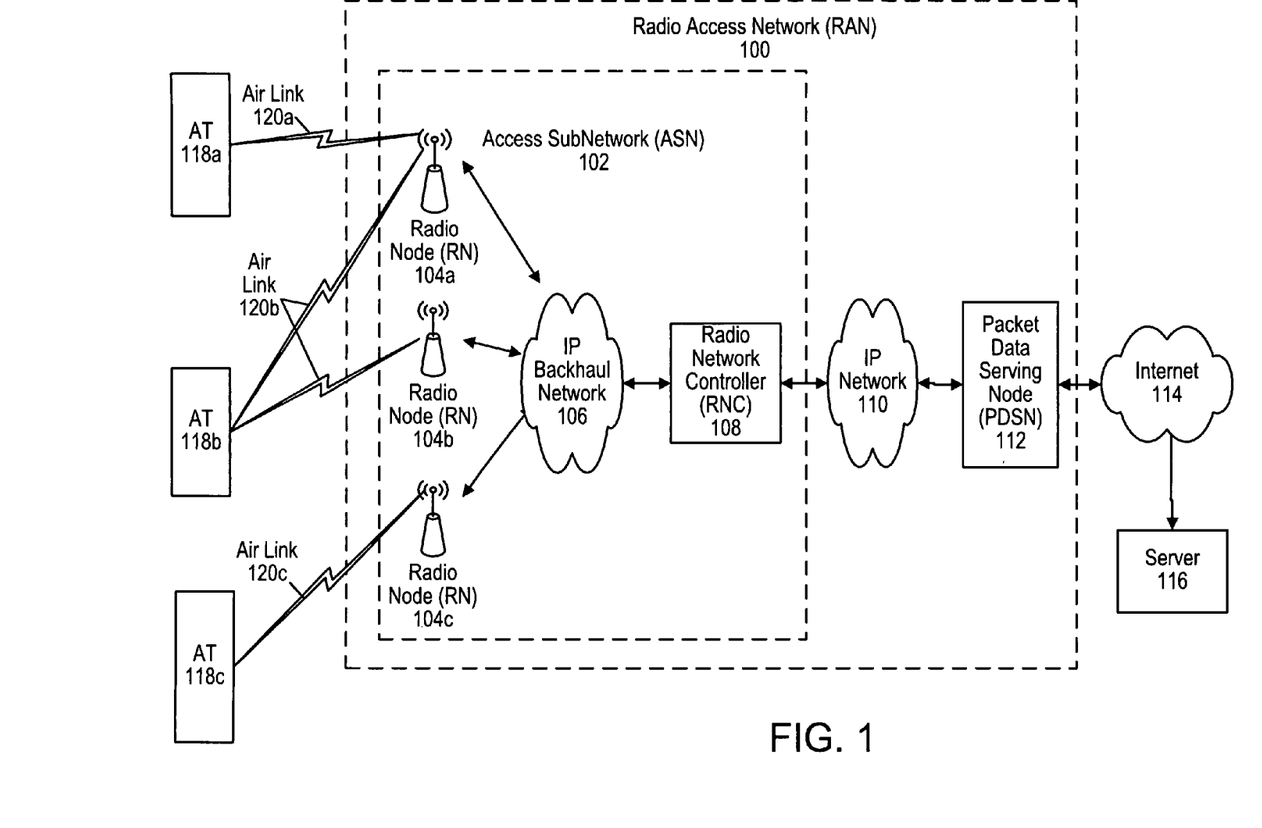
FIG. 1 is a block diagram of a radio access network.

Referring to FIG. 1, a radio access network (RAN) 100 uses CDMA 2000 protocols to transmit data packets between access terminals 118*a-c* and an external network such as the Internet 114. Examples of such protocols include: the first evolution data-optimized (1×EV-DO) protocol and the N×EV-DO protocol, which builds upon 1×EV-DO standard and is described in the IS856-Rev-B proposal (cited below). In the 1×EV-DO scheme, one forward link and one reverse link are assigned to each of the access terminals 118*a-c* for communication with the RAN 100. In the N×EV-DO scheme, an integral multiple of forward and reverse links may be assigned to each of the access terminals 118*a-c* for communication with the RAN 100. The 1×EV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification," 3GPP2 C.S0024-A, Version 2.0, June 2005, and is also incorporated herein by reference. Revision B to this specification has been initiated as TIA/EIA/IS-856, "CDMA2000 High Rate Packet Data Air Interface Specification," 3GPP2 C.S0024-B, Version 0.1, January 2006, but has yet not been adopted.

The RAN 100, which may cover a large service area, includes one or more Access Sub-Networks (ASNs), e.g., ASN 102, each anchored by a radio network controller (RNC) 108, communicating with several radio nodes (RNs) 104*a*-

104c using a private or public IP backhaul network 106. Each of the radio nodes 104a-104c may support multiple sectors, with each sector covering a certain cell area around one of the radio nodes 104a-104c.

An access sub-network 102 is connected over a public or private IP network 110 to one or more Packet Data Serving Nodes (PDSNs), e.g., PDSN 112. The packet data serving node 112, in turn, receives and transmits data packets (e.g., voice over IP packets) to a server 116 using the Internet 114. In some implementations, the functions of a packet data serving node 112 and radio network controller 108 are combined into a single device.

The access terminal 118a is in communication with the radio node 104a using an air link 120a, the access terminal 118b is in communication with both radio nodes 104a and 104b via an air link 120b, and the access terminal 118c is communication with the radio node 104c via an air link 120c. Examples of access terminals 118a-b include laptops, mobile telephones, personal data assistants (PDA), and other mobile or stationary electronic devices.

The air links 120a-c each comprises one or more channels. A channel includes a frequency band used by the RAN 100 to send data to the Access terminal (the forward link or downlink), and a different frequency band used by the Access Terminal to send data to the Access network (the reverse link or uplink). These frequency bands may be referred to as "carriers". Depending on the technology used, the number of forward links and reverse links could be different for a given channel.

Figure 2:
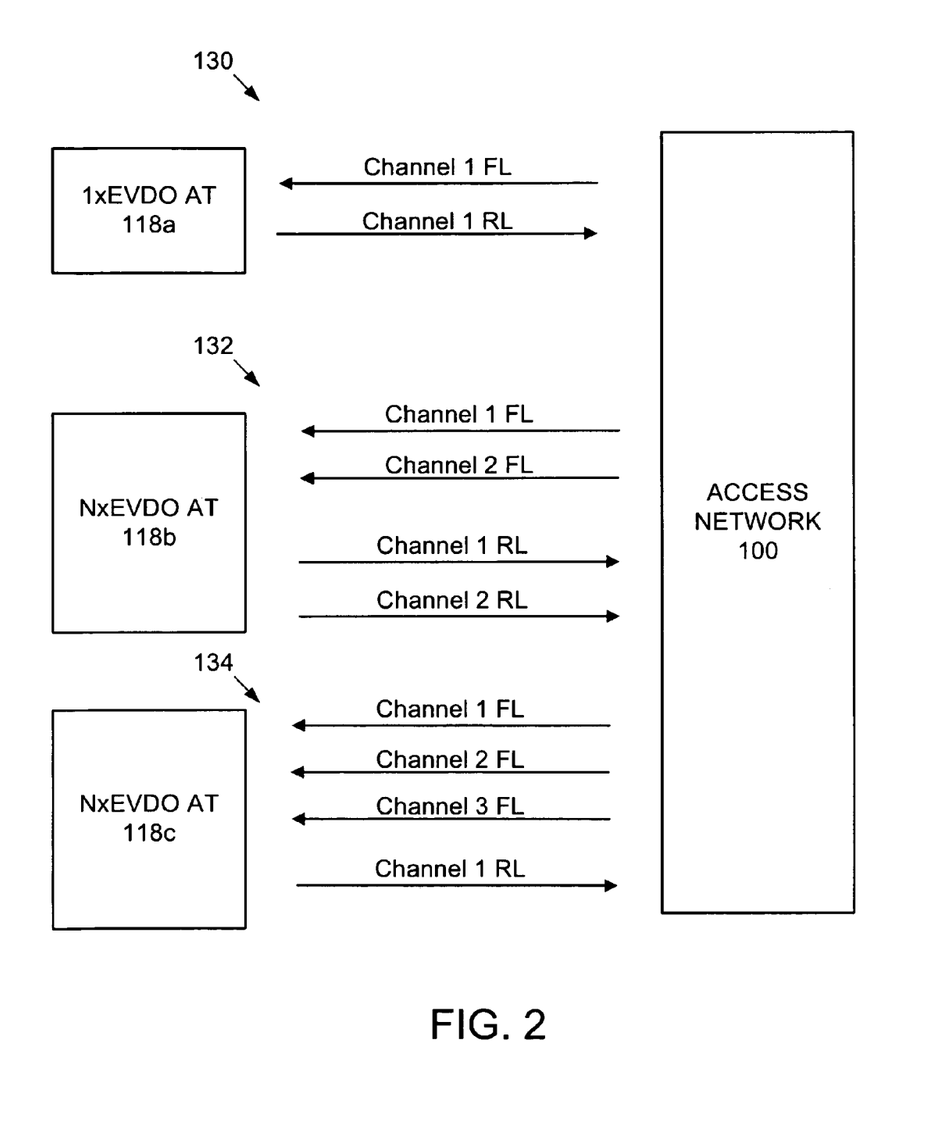
FIG. 2 is a diagram showing various link assignments.

FIG. 2 shows examples of assignments of reverse and forward links between the access terminals 118a-c and the radio access network 100. The access terminals 118a-c are interchangeable and could be connected to one or more of the radio nodes 104a-c. The first link assignment 130 shown in FIG. 2 is for use with a 1×EV-DO protocol. The access terminal 118a is assigned only one channel that includes one forward link (denoted "FL") and one reverse link (denoted "RL"). The second link assignment 132 is for use with an N×EV-DO protocol. The access terminal 118b is assigned two channels, each including a forward link and a reverse link. In this second assignment 132, the number of forward links and reverse links are symmetric (i.e., for each forward link, there is always a reverse link and vice versa). As shown in the third link assignment 134, N×EVDO access terminals could have an asymmetric number of forward links and reverse links. The access terminal 118c is assigned three forward links and one reverse link on three channels. The first channel includes a reverse link and a forward link, but the second and third channels each include only a reverse link.

Figure 3:
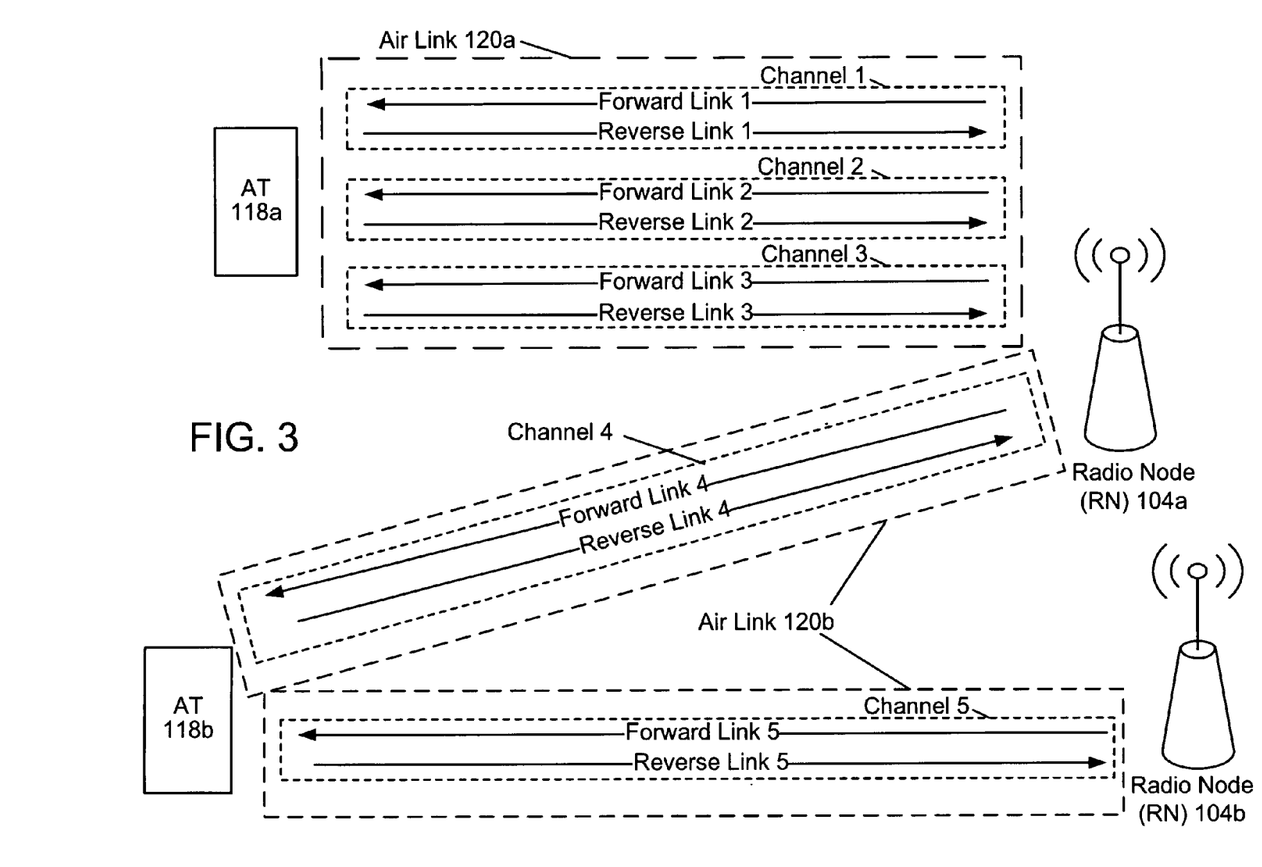
FIG. 3 is an illustration of the air links of the radio access network shown in FIG. 1.

The number of channels assigned to each of the access terminals 118a-c may be different and vary over time. FIG. 3 shows examples of assignments of channels to each of the access terminals 118a-b using a 3×EV-DO communication protocol. Although only the access terminals 118a-b are shown, the access terminal 118c could be substituted for either of access terminals 118a or 118b. Likewise, access terminals 118a-b are interchangeable. The access terminal 118a communicates with the radio node 104a over three channels (i.e., channels 1-3), each of which includes a forward link and a reverse link (i.e., channel 1 includes forward link 1 paired with reverse link 1, channel 2 includes forward link 2 paired with reverse link 2, and channel 3 includes forward link 3 paired with reverse link 3). The forward and reverse links of the channels 1-5 operate at different frequencies. Separate channels associated with a single access terminal may be hosted by the same radio node (e.g., as with access terminal 118a and radio node 104a) or they may be hosted by different radio nodes. For example, the access terminal 118b communicates with radio nodes 104a and 104b over channels 4 and 5, respectively. Channel 4 includes forward link 4 paired with reverse link 4 and channel 5 includes forward link 5 paired with reverse link 5.

In some embodiments, communication between an access terminal (e.g., access terminal 118a) and a radio node (e.g., radio node 104a) is confined to a specific pair of forward and reverse links (referred to as "symmetric pairs") such that any feedback associated with a forward link of a symmetric pair must be carried on its associated reverse link and vice versa. For example, a symmetric pair may consist of the forward and reverse links belonging each of the channels 1-5. In embodiments in which the forward and reverse link pairs of channels 1-3 are symmetric, communications generated at either the access terminal 118a or the radio node 104a in response to information carried by channel 1 are transmitted only through channel 1. Similarly, communications associated with channel 2 are confined to channel 2, and communications associated with channel 3 are confined to channel 3. Alternatively, a symmetric pair may consist of forward and reverse links belonging to different channels. For example, a symmetric pair may include forward link 1 of channel 1 and reverse link 2 of channel 2.

In some embodiments, communication between an access terminal and a radio node is not confined to any specific pair of forward and reverse links. In these embodiments, feedback associated with information carried by a specific forward link (or reverse link) may be transmitted over any reverse link (or forward link) including one that may belong to a different channel or one that is connected to a different radio node. For example, feedback generated in response to information transmitted from the access terminal 118b to the radio node 104a over reverse link 4 may be sent to the access terminal 118b from the radio node 104b over forward link 5.

In some embodiments, the number of forward links and the number of reverse links assigned to each of the access terminals 118 may not be equal. For example, the access terminal 118a may have three forward links and only one reverse link. In these embodiments, the channels 1-5 include either a forward link or a reverse link.

The radio network controller 108 determines the number of channels to assign to each of the access terminals 118a-b for communicating with one or more of the radio nodes 104a-c and schedules the transmission of data over the channels. Generally, the overall quality of service experienced by a user at one of the access terminals 118a-b depends on the throughput of data transmission between the access terminal and the radio node(s) servicing the access terminal. Increasing the number of channels assigned to the access terminal increases the throughput of data transmission between the RAN 100 and that access terminal. For applications that are delay-sensitive, it is desirable to maintain a sufficient level of throughput between each of the access terminals 118 and the RAN 100.

As an example, VoIP applications have strict delay requirements. The average bit-rate of VoIP traffic is approximately 4.5 Kbps to 8 Kbps, depending on the codec. To ensure a satisfactory user-experience, the end-to-end delay of a voice message from the speaker's mouth to the listener's ear should be less than 250 ms. This results in the condition that the delay in transmission of VoIP data packets over an air link in the forward direction (e.g., one of air links 120a-b) should be no more than approximately 120 milliseconds (msec). In general, the smaller the delay, the better is the voice quality as perceived by the user. In the N×EV-DO protocol, data is transmitted over the forward links using a time-division-multiplexed modulation scheme. Since N×EV-DO is a time-division-multiplexed system in the forward-link, it has limited ability to deliver data to multiple users in parallel. Thus, the delay in the delivery of VoIP packets over a forward-link depends, at least in part, on the quality of the signal as measured by the access terminal receiving the signal from the RAN 100, and the load on the RAN 100 (i.e., the number of access terminals being supported by the RAN 100).

One approach to improving throughput involves assigning to each of the access terminals 118a-c as many channels as the N×EV-DO communication protocol permits. In applying this approach to a 3×EV-DO communication protocol, the radio network controller 108 assigns three distinct channels, each formed by a pair of forward and reverse links, to each of the access terminals 118a-c. In this approach, each of the access terminals 118a-c uses energy to maintain reverse links on all three channels, which can drain the access terminal's power supply. Furthermore, the total number of access terminals that can be supported by the RAN 100 is limited by the capability of the most-loaded reverse link frequency band. Each reverse link maintained by a radio node delivers power to the radio node. Therefore, as more users connect to the radio node using the maximum number of reverse links, the power delivered to the radio node increases considerably. At a certain point, the power coming into the radio nodes 104a-c is too high; as a result, the system is no longer able accommodate additional users. Assigning the maximum number of forward links to an access terminal may be considered unnecessary and wasteful of forward-link resources when the access terminal has sufficient signal-to-noise ration (SNR) to provide the same or similar throughput using less than the maximum number of forward links.

Another approach involves assigning channels to the access terminals 118a-b based on the quality of the signal received by each of the access terminals 118a-b. In this approach, access terminals receiving signals from the RAN 100 with a lower SNR are assigned a larger number of channels than access terminals receiving signals from the RAN 100 with a higher SNR.

Figure 4:
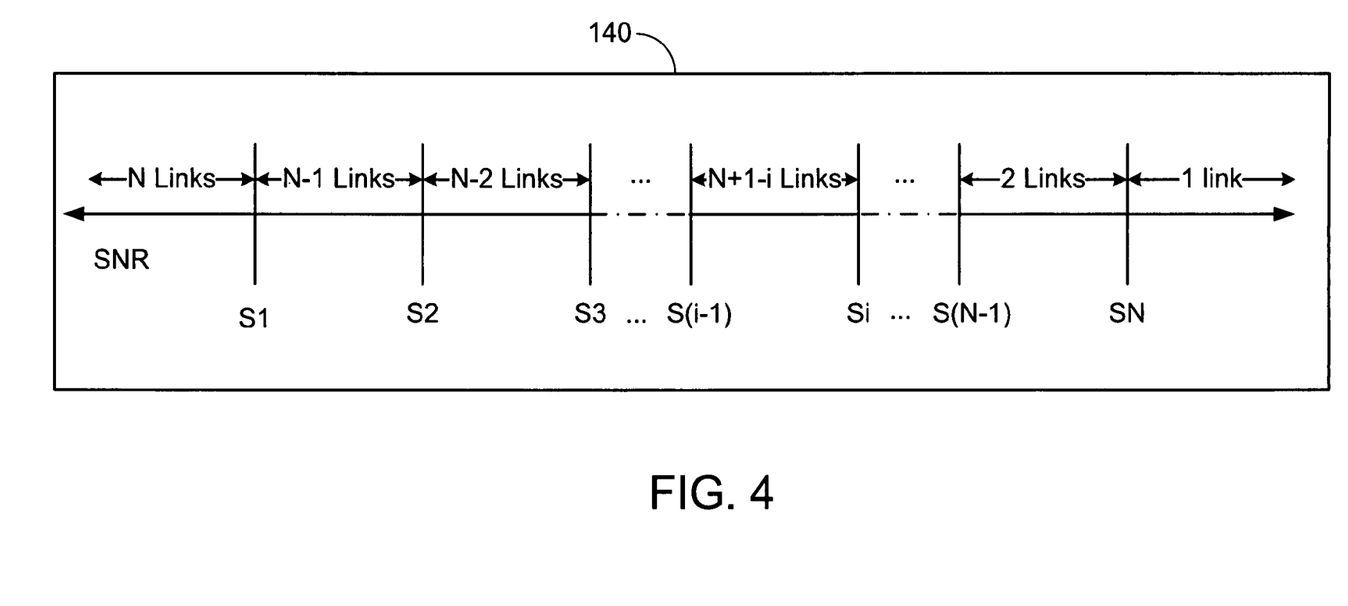
FIG. 4 is a diagram showing multiple regions of a signal-to-noise ratio range for use in determining a number of links assigned to an access terminal.

FIG. 4 shows a channel assignment model 140 for determining a number of channels to assign to an access terminal (e.g., access terminal 118a) in an N×EV-DO communication scheme in which a maximum of N channels may be assigned. The model 140 includes an SNR range divided into N multiple regions, the ends of which are defined by N SNR thresholds, labeled S1 to SN. The thresholds increase monotonically from S1 to SN. If an access terminal (e.g., access terminal 118a) reports an SNR on a specific forward-link frequency that is greater threshold SN, the radio network controller 108 assigns the access terminal only one channel. If the access terminal reports an SNR that is less than threshold SN but greater than threshold S(N−1), the radio network controller 108 assigns two channels to the access terminal. If the access terminal reports an SNR that is less than the threshold S1, that terminal is assigned N channels, the maximum number of channels permitted by the N×EV-DO standard. If the access terminal reports an SNR lying between thresholds Si and S(i−1), where i can be any integer between 1 and N, the number of channels assigned to the terminal is N+1−i. The regions of the SNR range 140 may be uniform or non-uniform.

Applying the model 140 to a 3×EV-DO scheme yields a SNR range having three regions defined by SNR thresholds S1 and S2. In this scheme, the radio network controller 108 assigns one link to access terminals reporting SNRs that are greater than S2, two links to access terminals reporting SNRs that are between S1 and S2, and three links to access terminals reporting SNRs that are less than S1.

The thresholds S1 to SN of the model 140 are computed from algorithms that determine a range of SNR that is sufficient to provide a required throughput for a given bit-rate or range of bit-rates and a given number of channels. In some embodiments, the thresholds S1 to SN may be derived from experimental data (one example of which is provided below). The model 140, which includes the thresholds S1 to SN and the rules for assigning channels based on the thresholds S1 to SN, is stored in the radio network controller 108. The model 140 may be represented by various forms, examples of which include: a chart, graph, table, and computer instructions (e.g., if/then statements).

Figure 5:
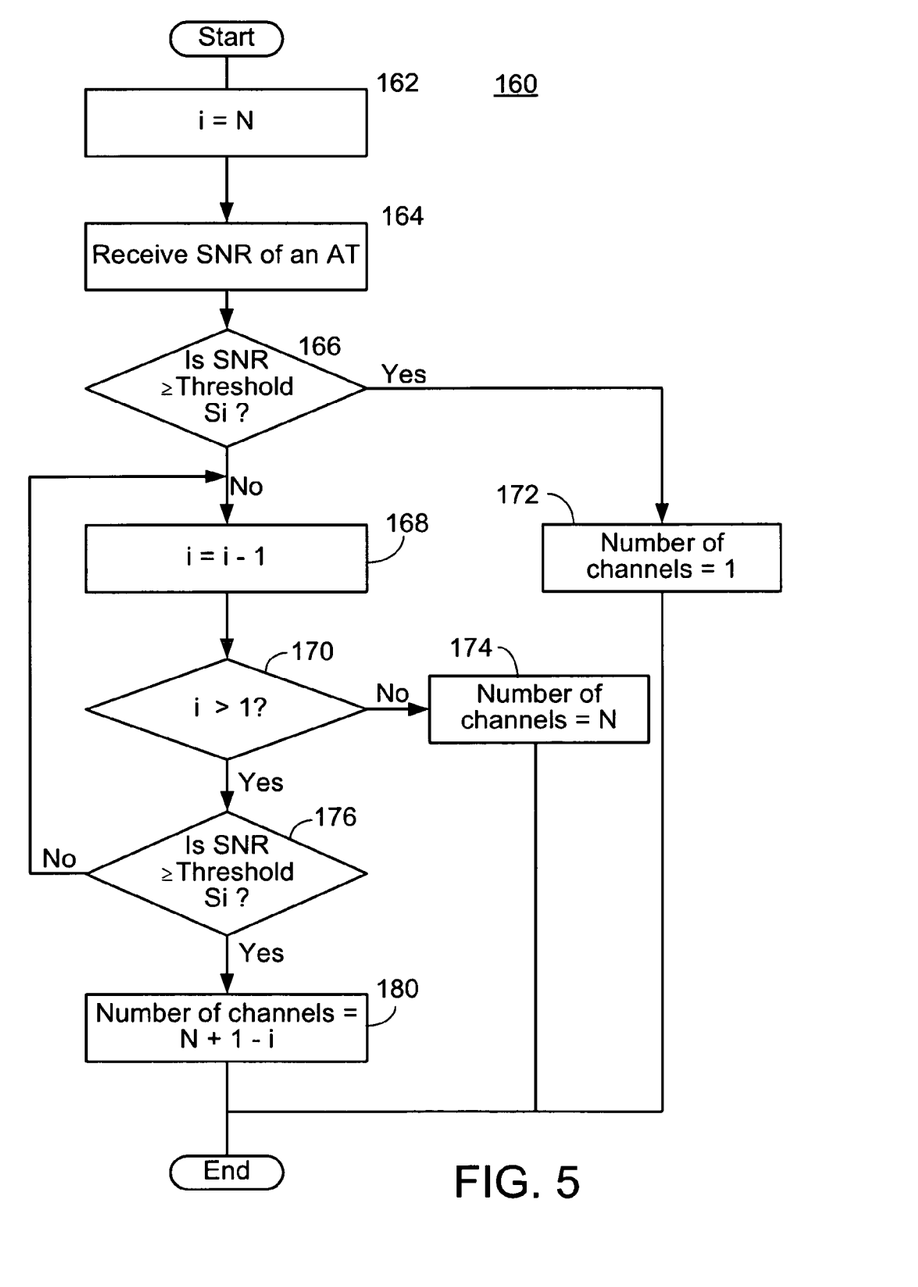
FIG. 5 is a flow diagram of a procedure for assigning links to an access terminal using the diagram shown in FIG. 3.

FIG. 5 illustrates a process 160 by which the radio network controller 108 assigns channels to an access terminal using the model 140 of FIG. 4. For ease of explanation, the process 160 is described in the context of assigning channels to the access terminal 118a and could be used in the same way to assign channels to the access terminals 118b-c. One or more steps of the process 160 may also be implemented by one or more of the radio nodes 104a-c in place of or in combination with the radio network controller 108.

The radio network controller 108 sets (162) an index number i equal to the maximum number of channels permitted by the N×EV-DO protocol. In this case, the maximum number is N. In embodiments implementing a 3×EV-DO protocol, N is equal to three, so the radio network controller 108 sets the index i equal to three.

When the access terminal 118a is requesting a new connection, it reports an SNR value to the RAN 100. In some embodiments, the access terminal 118a receives a pilot signal sent from the RAN 100 and reports the strength of the received pilot signal to the RAN 100 in a Route Update message. The Route Update message may also include the relative signal strengths of multiple pilot signals received by the access terminal 118a. Based on the pilot signal strength(s) reported by the access terminal 118a, the radio network controller 108 determines (164) the SNR of the access terminal 118a on all the applicable forward links. The radio network controller 108 compares (166) the maximum SNR value to the largest SNR threshold (i.e., threshold SN) of the model 140 shown in FIG. 4. If the SNR value is greater than or equal to the threshold SN, the radio network controller 108 assigns only one channel to the access terminal 118a. If, however, the maximum SNR value is less than the threshold SN, the index i is decremented (168) by one (i.e., index i is now equal to N−1). The forward-link that is removed from candidacy is the link where the AT reports the lowest SNR. The process 160 then determines (170) whether the index i is greater than one. If the index i is greater than one, the process 160 determines (176) whether the SNR value is greater than the threshold Si (i.e., threshold S(N−1)) since index i is equal to N−1 at this time). The process 160 repeats the decrementing (168), determining (170), and comparison (176) steps until either the maximum SNR value is greater than or equal to the threshold Si or until the index i is determined (170) to be equal to one. If index i is equal to one, then the SNR value is known to be less than threshold S1, the lowest threshold; and as a result, the controller assigns the maximum number of channels, N, to the access terminal 118a. If, however, the radio network controller 108 determines (176) that the SNR value is greater than or equal to a threshold Si before index i is decremented to a value of one, the radio network controller 108 assigns a number of channels equal to N+1−i to the access terminal 118a. For example, if N is equal to three, and the maximum SNR value is determined to be greater than or equal to threshold S2 but less than threshold S3 (index i is equal to two), the controller assigns two channels corresponding to the highest SNRs to the access terminal 118a.

Once the connection between the access terminal 118a and the radio access network 100 has been established, the radio network controller 108 continuously monitors the SNR of the access terminal 118a. In some embodiments, the access terminal 108 updates the radio network controller 108 with an SNR value approximately 100 times per second. When implementing the NxEV-DO communication standard, the radio network controller 108 monitors data rate control (DRC) values reported by the access terminal 118a over its reverse links. A DRC value includes the rate at which the access terminal 118a desires to receive data and is generally proportional to the strength of the signals the access terminal 118a is receiving from the radio node 104a. From the DRC value, the radio network controller 108 determines the SNR of the access terminal 118a. The radio network controller 108 compares the most recently received DRC value with previously received DRC values to determine whether the SNR at the access terminal 118a is increased or decreased. The radio network controller 108 may assign additional channels to the access terminal 118a if the SNR has decreased or remove channels if the SNR has increased.

In some embodiments, the radio network controller 108 determines how many channels to add or remove based upon the magnitude of change in the SNR. For example, if the magnitude is greater than a predefined value, the radio network controller 108 either adds or removes a number of channels corresponding to the predefined value. In some embodiments, the radio network controller 108 determines the number of channels corresponding to the most current SNR value using the model 140 of FIG. 4 according to the process 160 of FIG. 5 and either adds channels to the access terminal 118a or removes channels that have already been established from the access terminal 118a until the total number of channels assigned to the access terminal 118a is equal to the number of channels corresponding to the most current SNR as determined using the model 140.

If the access network senses a need to change the number of forward-links assigned to a specific AT, it could ask the access terminal to send SNR information periodically corresponding to all the candidate forward links. In an NxEVDO system, the access network could trigger this by sending a RouteUpdateRequest message to the access terminal.

In some implementations, the process 160 is modified such that the SNR value is first compared to the lowest threshold S1 and subsequently compared to higher thresholds. In some implementations, algorithms other than process 160 may be used to determine the region in which the SNR value lies.

In the context of the 3x-EV-DO communication protocol, the following simulations compare the average forward-link scheduling delay of a first channel assignment scheme, in which channels are assigned to access terminals based on their SNRs in accordance with the model 140 shown in FIG. 4, with that of a second channel assignment scheme, in which every access terminal is assigned exactly three channels (i.e., the maximum number of channels permitted by the 3x-EV-DO communication protocol).

When performing the simulations, a number of assumptions were made. At the system level, these include a 2.0 GHz frequency of operation, a cell-to-cell distance of 2 km, a maximum path loss of 138 dB, a 3GPP2 mixed speed distribution, 3x independent carries, and 120 access terminals. The radio nodes were implemented on a scheduler provided by QualComm, Inc. Other assumptions include each access terminal having one VoIP flow and dual receive antennas.

Figure 6:
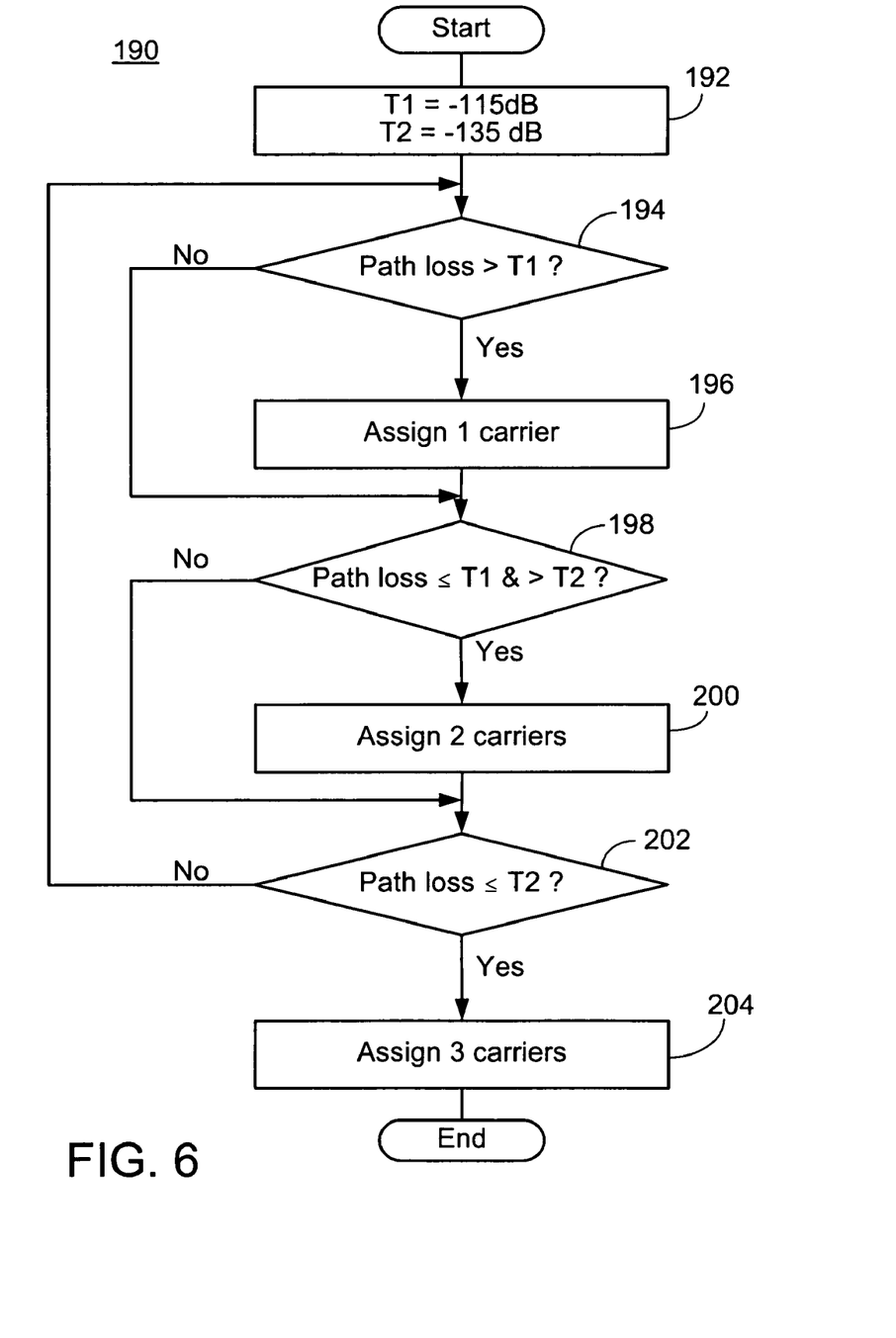
FIG. 6 is a flow diagram of a procedure used in simulations for assigning links to an access terminal.

FIG. 6 shows a flowchart of a process 190 for implementing a simple carrier assignment algorithm that uses the path loss as an indication of the signal to noise ratio experienced by the access terminal. Two thresholds T1 and T2 are set (192) to −115 dB and −135 dB, respectively (threshold T1 is greater than threshold T2). If the path loss is determined (194) to be less than threshold T1, the access terminal is assigned (196) only one carrier. Otherwise, if the path loss is determined (198) to be less than or equal to threshold T1 but greater than threshold T2, two carriers assigned (200) to the access terminal. Otherwise, if the path loss is determined (202) to be less than or equal to threshold T2, three carriers are assigned (204) to the access terminal. The process may continually recheck the path loss and reassign carriers as necessary.

When assigning carriers using the process 190 of FIG. 6 according to the previous assumptions, the average number of carriers per access terminal is 1.92. This value is considerably smaller compared to an average value of 3 obtained when three carriers are assigned to each access terminal.

Figure 7:
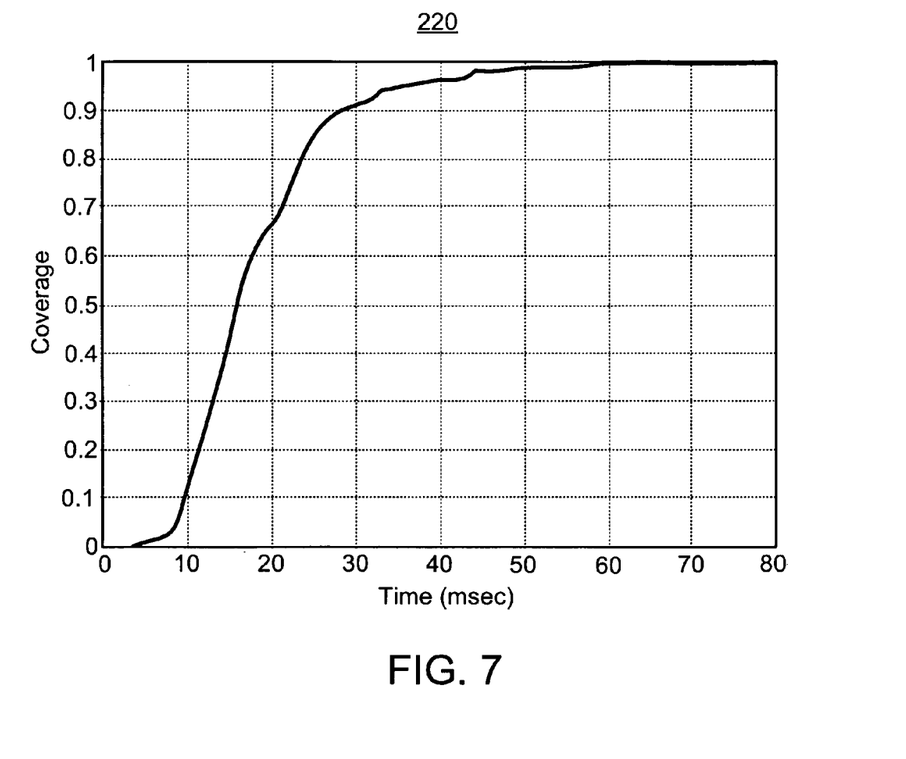
FIG. 7 plots a number of access terminals experiencing delay using a fixed carrier assignment scheme.
Figure 8:
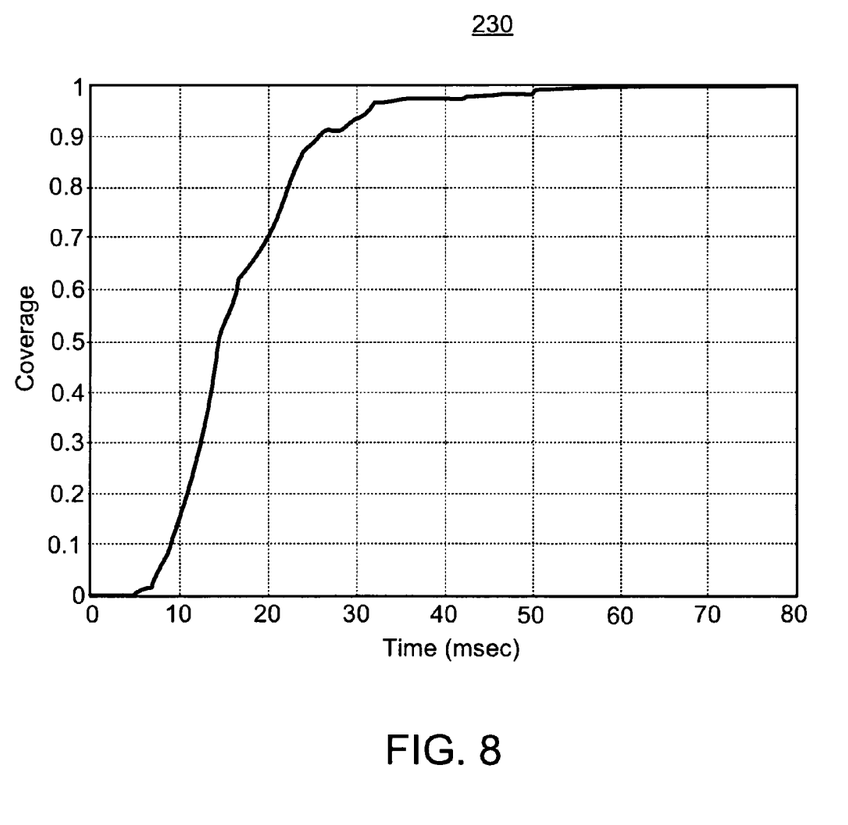
FIG. 8 plots a number of access terminals experiencing delay using the procedure shown in FIG. 6.
Figure 9:
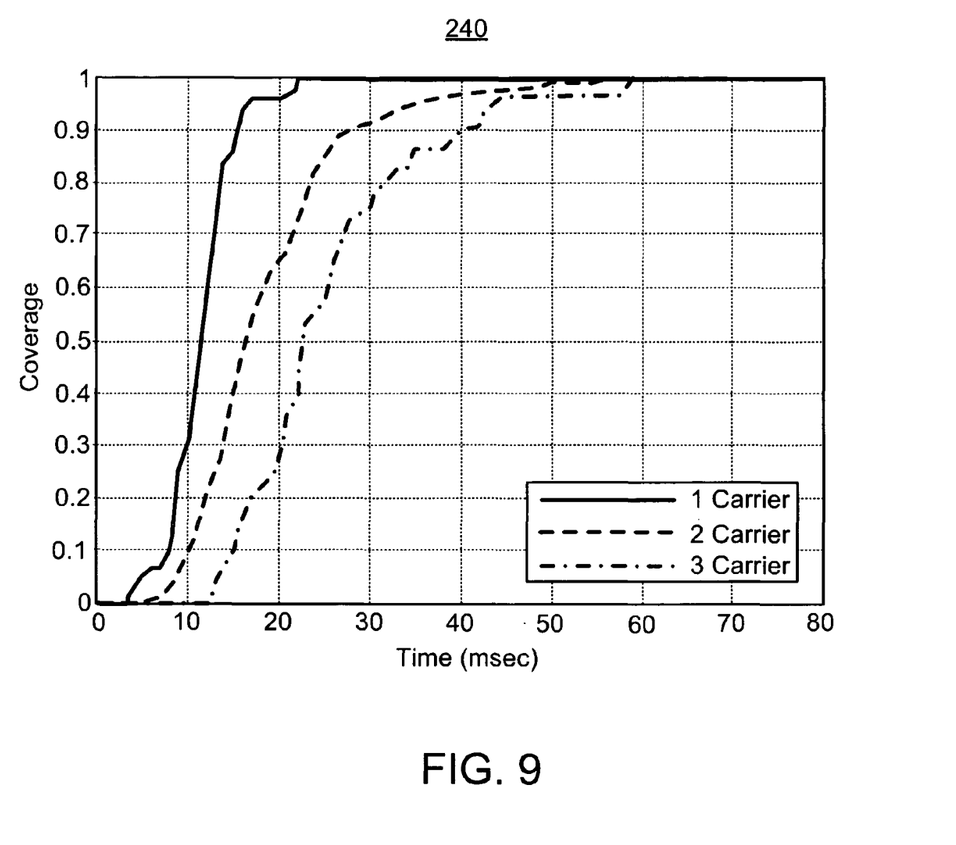
FIG. 9 plots a number of access terminals experiencing delay grouped according to the number of assigned carriers.

FIGS. 7, 8, and 9 shows plots 220, 230, and 240 of the percentage of access terminals experiencing delays in the forward link using various scheduling schemes. In each of the plots 220, 230, and 240, the x-axis represents the delay in milliseconds experienced by the access terminals in the forward-link, and the y-axis represents the percentage of access terminals experiencing delays that are less than or equal to the delay specified by the x-axis.

The plot 220 of FIG. 7 describes a first scheduling scheme in which exactly three carriers are assigned to each access terminal. The plot 230 of FIG. 8 describes a second scheduling scheme in which the number of carriers assigned to each access terminal is determined by its signal-to-noise ratio according to the process 190 shown in FIG. 6. The plot 240 of FIG. 9 shows the delay experienced by the access terminals grouped according their number of carriers assigned to them using the process 190 shown in FIG. 6.

The simulations show that the average forward-link scheduling delay with the optimal second scheduling scheme, where the channel assignment is based on the signal to noise ratio of each access terminal is comparable to the first scheduling scheme, where every access terminal has exactly three carriers. Accordingly, the second scheme has almost no penalty in terms of scheduling delays. Since the average number of channels per access terminal is less than three in the second scheme, each reverse link channel supports fewer users and consequently, the rise-over-thermal (ROT) (i.e., the ratio of total power received by a radio node from a sector to a baseline thermal noise) is lower in the second scheme than in the first scheme. As indicated by the lower ROT associated with the second scheme, to support the same amount of users, a RAN implementing the second scheme is subjected to less power than the same RAN implementing the first scheme. Furthermore, since each access terminal has to transmit on a lower number of frequencies, it has to spend less power to maintain the connection, and thus its battery life can be prolonged. In other words, the simulations show that a RAN implementing the second scheme can support more users with less traffic delay than the same RAN implementing the first scheme.

Although the techniques described above employ the NxEV-DO air interface standard, the techniques are also applicable to other CDMA and non-CDMA air interface technologies. Although some of the above examples describe determining the SNR of an access terminal from the signal strength of a pilot signal as it is received by the access terminal, other attributes of the pilot signal, such as phase or time delay, or attributes of other signals sent from the RAN to the access terminal can also be used to determine the SNR of the access terminal. In addition, the RAN can compute the SNR of the access terminal by measuring various attributes of signals sent from the access terminal to the radio node. Examples of these attributes include signal strength, signal delay, phase, and power. In some examples, the computation of SNR can be performed at either or both of the access terminal and the radio node and then reported directly to the radio network controller or any other suitable location.

Furthermore, the number of channels assigned to an access terminal may be based on metrics other than SNR that are derived from (1) attributes of signals sent from the radio node to the access terminal, (2) attributes of signals sent from the access terminal to the radio node, or (3) from combinations of (1) and (2).

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are within the scope of the following claims. For example, the computations described can be performed at one or more of the radio nodes 140*a-c*, at the radio network controller 108, or at other elements of the RAN 100.

What is claimed is:

1. A method implemented by a radio network device, the method comprising:
    retrieving, by the radio network device, a channel assignment model that assigns one or more numbers of frequency channels to one or more signal strength values in a range of signal strength values, wherein the one or more numbers of frequency channels, assigned to the one or more signal strength values, decrease as the one or more signal strength values increase;
    receiving a signal strength value associated with an access terminal;
    comparing the signal strength value associated with the access terminal to at least one of the one or more signal strength values in the channel assignment model;
    determining, based on comparing and the channel assignment model, a number of frequency channels, wherein the number of frequency channels are configured to operate simultaneously to provide a desired throughput of communications between the access terminal and a radio node of a radio access network; and
    assigning, to the access terminal, the number of frequency channels.

2. The method of claim 1, wherein the signal strength value associated with the access terminal comprises a signal-to-noise (SNR) ratio.

3. The method of claim 1, further comprising:
    monitoring the signal strength value associated with the access terminal; and
    adjusting the number of frequency channels in response to detecting a change in the signal strength value associated with the access terminal.

4. The method of claim 1, wherein one or more of the frequency channels comprise one or more of (i) a forward link configured to transmit data from the radio node to the access terminal, and (ii) a reverse link configured to transmit data from the access terminal to the radio node.

5. The method of claim 1, wherein comparing the signal strength value comprises:
    comparing the signal strength value to a predetermined threshold value in the range of signal strength values.

6. The method of claim 1, further comprising:
    determining the signal strength value associated with the access terminal based on a signal sent from the access terminal to the radio node.

7. The method of claim 6, wherein the signal comprises a route update message signal.

8. The method of claim 1, further comprising:
    determining the signal strength value associated with the access terminal from a data rate value sent from the access terminal to the radio node, the data rate value being proportional to the signal strength value associated with the access terminal.

9. The method of claim 8, further comprising one or more of:
    unassigning the frequency channels to the access terminal at least partly based on changes in the data rate value; and
    assigning the frequency channels to the access terminal at least partly based on changes in the data rate value.

10. The method of claim 1, wherein the assigning complies with one or more of: a 1× Evolution-Data Optimized (EV-DO) protocol, a 3×EV-DO protocol, an N×EV-DO protocol, and a IS856-Rev-B protocol.

11. An apparatus comprising:
a radio network device; and
a non-transitory computer-readable storage medium configured to store instructions that are executable by a processor of the radio network device to perform functions comprising:
retrieving a channel assignment model that assigns one or more numbers of frequency channels to one or more signal strength values in a range of signal strength values, wherein the one or more numbers of frequency channels, assigned to the one or more signal strength values, decrease as the one or more signal strength values increase;
receiving a signal strength value associated with an access terminal;
comparing the signal strength value associated with the access terminal to at least one of the one or more signal strength values in the channel assignment model;
determining, based on comparing and the channel assignment model, a number of frequency channels, wherein the number of frequency channels are configured to operate simultaneously to provide a desired throughput of communications between the access terminal and a radio node of a radio access network; and
assigning, to the access terminal, the number of frequency channels.

12. The apparatus of claim 11, wherein the signal strength value comprises a signal-to-noise (SNR) ratio.

13. The apparatus of claim 11, wherein the functions further comprise:
monitoring the signal strength value associated with the access terminal; and
adjusting the number of frequency channels in response to detecting a change in the signal strength value associated with the access terminal.

14. The apparatus of claim 11, wherein one or more of the frequency channels comprise one or more of (i) a forward link configured to transmit data from the radio node to the access terminal, and (ii) a reverse link configured to transmit data from the access terminal to the radio node.

15. The apparatus of claim 11, wherein the functions further comprise:
comparing the signal strength value associated with the access terminal to a predetermined threshold value in the range of signal strength values.

16. The apparatus of claim 11, wherein the functions further comprise:
determining the signal strength value associated with the access terminal based on a signal sent from the access terminal to the radio node.

17. The apparatus of claim 16, wherein the signal comprises a route update message signal.

18. The apparatus of claim 11, wherein the functions further comprise:
determining the signal strength value associated with the access terminal from a data rate value sent from the access terminal to the radio node, the data rate value being proportional to the signal strength value associated with the access terminal.

19. The apparatus of claim 18, wherein the functions further comprise one or more of:
unassiging the frequency channels to the access terminal at least partly based on changes in the data rate value; and
assigning the frequency channels to the access terminal at least partly based on changes in the data rate value.

20. The apparatus of claim 11, wherein the radio network device is configured to comply with one or more of: a 1× Evolution-Data Optimized (EV-DO) protocol, a 3×EV-DO protocol, an N×EV-DO protocol, and a IS856-Rev-B protocol.

21. The apparatus of claim 11, wherein the communications comprise a transfer of voice over internet protocol (IP) packets.

22. A non-transitory computer-readable storage medium configured to store instructions that are executable by a processor of a radio network device to perform functions comprising:
retrieving a channel assignment model that assigns one or more numbers of frequency channels to one or more signal strength values in a range of signal strength values, wherein the one or more numbers of frequency channels, assigned to the one or more signal strength values, decrease as the one or more signal strength values increase;
receiving a signal strength value associated with an access terminal;
comparing the signal strength value associated with the access terminal to at least one of the one or more signal strength values in the channel assignment model;
determining, based on comparing and the channel assignment model, a number of frequency channels, wherein the number of frequency channels are configured to operate simultaneously to provide a desired throughput of communications between the access terminal and a radio node of a radio access network; and
assigning, to the access terminal, the number of frequency channels.

* * * * *

UNITED STATES PATENT AND TRADEMARK OFFICE
CERTIFICATE OF CORRECTION

PATENT NO. : 7,953,040 B2
APPLICATION NO. : 11/406600
DATED : May 31, 2011
INVENTOR(S) : Gopal Harikumar et al.

It is certified that error appears in the above-identified patent and that said Letters Patent is hereby corrected as shown below:

Column 10, Line 65, In Claim 10, delete "1× Evolution-Data" and insert -- 1×Evolution-Data --, therefor.

Column 12, Line 16, In Claim 19, delete "unassiging" and insert -- unassigning --, therefor.

Column 12, Lines 21-22, In Claim 20, delete "1× Evolution-Data" and insert -- 1×Evolution-Data --, therefor.

Signed and Sealed this
Twelfth Day of July, 2011

David J. Kappos
*Director of the United States Patent and Trademark Office*